United States Patent [19]

Nakane et al.

[11] Patent Number: 5,496,513
[45] Date of Patent: Mar. 5, 1996

[54] PREPARATION METHOD OF DENSE SINTERED BODIES FOR SOLID ELECTROLYTES

[75] Inventors: Kenji Nakane; Tetsu Umeda; Masahide Mohri, all of Tsukuba, Japan

[73] Assignee: Sumitomo Chemical Company, Limited, Osaka, Japan

[21] Appl. No.: 984,199

[22] Filed: Dec. 2, 1992

[30] Foreign Application Priority Data

Dec. 6, 1991 [JP] Japan ..................... 3-322945
May 29, 1992 [JP] Japan ..................... 4-138672

[51] Int. Cl.⁶ ..................... B22F 3/16
[52] U.S. Cl. ............... 419/19; 419/23; 419/42; 419/45
[58] Field of Search ............. 419/19, 23, 42, 419/45, 46

[56] References Cited

U.S. PATENT DOCUMENTS

| | | | |
|---|---|---|---|
| 3,295,934 | 1/1967 | Bré | 29/182.5 |
| 3,658,597 | 4/1972 | Gray | 136/148 |
| 4,113,928 | 9/1978 | Virkar et al. | 429/193 |
| 4,297,419 | 10/1981 | Nickols, Jr. et al. | 429/44 |
| 4,317,866 | 3/1982 | Trocciola et al. | 429/41 |
| 4,689,077 | 8/1987 | Chevigne et al. | 75/233 |
| 4,946,664 | 8/1990 | Van Zyl et al. | 423/600 |
| 4,948,676 | 8/1990 | Darracq et al. | 428/539.5 |
| 5,081,082 | 1/1992 | Hai-Doo et al. | 501/153 |
| 5,096,450 | 3/1992 | Sugimura et al. | 445/50 |
| 5,158,916 | 10/1992 | Claussen | 501/127 |

FOREIGN PATENT DOCUMENTS

| | | |
|---|---|---|
| 0490245 | 6/1992 | European Pat. Off. . |
| 8803520 | 5/1988 | WIPO . |

*Primary Examiner*—Donald P. Walsh
*Assistant Examiner*—Chrisman D. Carroll
*Attorney, Agent, or Firm*—Stevens, Davis, Miller & Mosher

[57] ABSTRACT

A method of preparing dense sintered bodies of beta alumina suitable for solid electrolytes, which comprises preparing a shaped body from a mixture containing an aluminum powder, a sodium compound, a structure stabilizer and a zirconia powder or from a mixture containing an aluminum powder, an alumina powder, a sodium compound, a structure stabilizer and a zirconia powder, and reaction-sintering the shaped body.

6 Claims, No Drawings

1

PREPARATION METHOD OF DENSE SINTERED BODIES FOR SOLID ELECTROLYTES

BACKGROUND OF THE INVENTION

1. Field of the Invention

The present invention relates to a method of preparing a dense sintered body formed of zirconia-containing beta alumina (The term "beta alumina" hereinafter includes β and β" alumina, and a mixture thereof) for a solid electrolyte. It relates to a method of preparing a dense sintered body being excellent in sodium ion conductivity and useful as a solid electrolytic material for a sodium-sulfur secondary battery and an alkali metal thermo-electric converter.

2. Technical Background and Prior Art

A beta alumina sintered body is produced by a method in which a beta alumina powder material is shaped and sintered. It is also produced by a method in which a mixture of an α-alumina powder, a sodium compound (e.g., sodium carbonate) and a structure stabilizer (e.g., lithium carbonate) is shaped and sintered. In this method, a process of synthesizing beta alumina by a reaction between an α-alumina powder and a sodium compound and a sintering process proceed simultaneously.

PCT/EP89/00382 (W089/09755) discloses a method of preparing a ceramic sintered body in which an aluminum powder is mixed with alumina, shaped and sintered. In the method disclosed in this International Publication, the incorporated alumina remains in a sintered body to constitute the sintered body without being altered, and the International Publication does not disclose any reaction in which alumina reacts with a sodium compound to alter itself into beta alumina.

A beta alumina sintered body suitable for a solid electrolyte is required to be dense. Since, however, beta alumina is a substance hard to be sintered, it is difficult to produce a dense sintered body from a beta alumina powder by sintering it. A study is therefore under way to develop a method in which a fine powder of beta alumina is synthesized and sintered. However, beta alumina reacts with water in air to deteriorate, and in particular, a fine powder thereof is highly liable to be decomposed. Therefore, facilities sufficient for storage and handling are required, and it involves difficulty to industrialize the above method.

In the method in which a mixture of an α-alumina powder, a sodium compound and a structure stabilizer is shaped and sintered, there is a problem in that the reaction does not sufficiently proceed, and an obtained sintered body has residual α-alumina. As the α-alumina has no sodium ion conductivity, residual α-alumina decreases the electrical conductivity, consequently the sintered body is not suitable for a solid electrolyte.

As described above, the techniques for obtaining a beta alumina sintered body suitable for a solid electrolyte have not yet been satisfactory. It is therefore an object of the present invention to provide a method of preparing a dense sintered body or beta alumina suitable for a solid electrolyte.

SUMMARY OF THE INVENTION

According to the present invention, there is provided a method of preparing a dense sintered body for a solid electrolyte, which comprises milling a mixture containing an aluminum powder, a sodium compound, a structure stabilizer and a zirconia powder with a dispersing liquid by means of a mill, drying the resultant milled mixture to remove the dispersing liquid and obtain a powder mixture, shaping the powder mixture and reaction-sintering it.

According to the present invention, there is also provided a method of preparing a dense sintered body for a solid electrolyte, which comprises further adding an alumina powder to the mixture containing an aluminum powder, a sodium compound, a structure stabilizer and a zirconia powder, milling the resultant powder mixture, drying the milled mixture and reaction-sintering it.

DETAILED DESCRIPTION OF THE INVENTION

The aluminum powder used as a raw material preferably has an average particle diameter of 300 μm or less to obtain a homogeneous mixture. It is also required to have a high purity, and in particular, the contents of silicon and iron are preferably 1,000 ppm or less each, more preferably 200 ppm each or less, since silicon and iron decrease the sodium ion conductivity of beta alumina.

An aluminum powder is oxidized when sintered in air, and converted to beta alumina when it further reacts with a sodium compound and a structure stabilizer. In this case, aluminum undergoes volume expansion. This volume expansion partially offsets sintering-induced shrinkage to decrease the shrinkage factor. Therefore, the method of the present invention is industrially advantageous in that dimensional accuracy is achieved and that post-processing is obviated.

The sodium compound includes sodium oxide, sodium carbonate and sodium hydroxide. Further, aluminum-containing compounds such as sodium aluminate may be also used. However, sodium nitrate is not preferred, since it has high oxidizing properties, promotes oxidation of an aluminum powder in a mixture of raw materials and may cause an explosive oxidation reaction. The amount of the sodium compound is preferably 1% to 40% by weight based on the mixture of the raw materials. When it is less than 1% by weight, no beta alumina is formed. When it is more than 40% by weight, a sodium compound remaining in a sintered body undesirably decreases the sodium ion conductivity of the sintered body.

The structure stabilizer includes salts containing ions of metals such as magnesium, lithium, nickel, cobalt, copper, zinc and manganese although it shall not be limited thereto in the present invention. The amount of the structure stabilizer is preferably 0.1% to 10% by weight based on the mixture of the raw materials. When it is less than 0.1% by weight, α-alumina or γ-alumina remains in a sintered body to decrease the sodium ion conductivity. When it exceeds 10% by weight, an excess of the structure stabilizer remaining in a sintered body undesirably decreases the sodium ion conductivity of the sintered body.

A zirconia powder has an effect of promoting the oxidation of an aluminum powder, although the reason therefor is not yet clear. Since, however, zirconia has no sodium ion conductivity, it decreases the sodium ion conductivity of a sintered body if incorporated in a large amount. Therefore, the amount of the zirconia is preferably 50% by weight or less, more preferably 25% by weight or less. A zirconia powder undergoes no reaction with beta alumina, and contributes to an improvement in fracture toughness by being dispersed in a sintered body. A zirconia powder to be incorporated may be of a monoclinic phase, and it may be also of a tetragonal phase and a cubic phase stabilized by yttrium oxide, etc. In order to improve its effect of improving the fracture toughness, it is preferred to disperse zirconia in a state of a tetragonal phase.

The alumina powder may be any one of α-alumina, transition alumina such as γ-alumina and a mixture of these. The incorporated alumina reacts with a sodium compound and a structure stabilizer to convert itself into beta alumina. It is therefore preferred to incorporate a fine powder of alumina having a high purity and having an average particle diameter of 3 μm or less so that sodium and a structure stabilizer can be easily diffused. The incorporation of the alumina powder enables the control of the shrinkage factor to a desired one. Therefore, when the alumina powder amount is too large and when the aluminum powder amount is too small, the effect of decreasing the shrinkage factor may not be obtained, and the sintered body density decreases. The amount of the aluminum powder is preferably at least 10% by weight based on the mixture of the raw material.

The dispersing liquid is preferably selected from non-aqueous organic solvents such as acetone, cyclohexane and mineral spirit.

For milling, it is preferred to use a mill having a high milling force such as an attrition mill or a ball mill.

For removing the dispersing liquid used, the temperature and time for drying may be determined depending upon the dispersing liquid.

The shaped body is produced by any one of general methods such as dry pressing, slip casting, tape casting and injection molding. The shaped body may be generally subjected to cold isostatic pressing (to be abbreviated as CIP hereinafter) treatment under a pressure of 45 to 900 MPa.

The shaped body is sintered preferably at a temperature between 1,200° C. and 1,600° C. for 5 minutes to 5 hours. When the temperature is lower than 1,200° C., the resultant sintered body has a low density, and the reaction for forming beta alumina does not sufficiently proceed. When it is higher than 1,600° C., abnormal grain growth occurs, and the resultant sintered body sometimes shows a decrease in mechanical strength and deteriorates when electricity is applied.

When the so-obtained zirconia-containing beta alumina sintered body has a relative density of less than 85%, it can be no longer used, since there are residual open pores, and liquid sodium penetrates the sintered body when it is used as a solid electrolyte of a sodium-sulfur secondary battery.

The β-alumina/β"-alumina ratio can be controlled by adjusting the ratio of the sodium compound to the total molar amount of aluminum element in the raw material. Since, however, sodium is partially lost due to evaporation during the sintering, there is employed a method using the sodium compound in an amount a little larger than the amount of sodium in the intended composition of the sintered body.

Method of Measurement

Sintered bodies are measured by the following methods.

[Density of sintered body]

Measured by an Archimedes method using ethanol.

[Formed phase of sintered body]

Measure using X-ray diffractometry (Model No. 2013, supplied by Rigaku Corporation). The ratios of formed α-alumina, β-alumina and β"-alumina were calculated on the basis of ratios of beam intensities of α(024), β(0013) and β"(107) diffraction beams determined by X-ray diffractometry.

[Sodium ion conductivity of sintered body]

Measure using a complex impedance plot method.

[Relative density]

For calculation, the theoretical density of β-alumina is taken as 3.26 g/cm$^3$, and that of β"-alumina as 3.29 g/cm$^3$.

EXAMPLE 1

160.0 Grams of an aluminum powder (purity 99,987%, average particle diameter 28.6 μm, supplied by Toyo Aluminum Co., Ltd.) 59.0 g of sodium carbonate (reagent special grade, supplied by Wako Pure Chemical Industries, LTD.), 6.9 g of lithium carbonate (reagent special grade, supplied by Wako Pure Chemical Industries, LTD.) and 60.0 g of a stabilized zirconia powder (SYZ-3, supplied by Sumitomo Chemical Co., Ltd.) which was a solid solution of 3 mol % of yttrium oxide in zirconia were added to cyclohexane, and these components were milled and mixed with an attrition mill (MA-1SE using 2 mmφ zirconia balls, supplied by Mitsui-Miike Engineering Corporation) for 6 hours. The cyclohexane was removed from the resultant mixture by evaporation by means of a rotary evaporator, and the mixture was passed through a 60-mesh sieve. 1.2 Grams of the resultant powder was taken out, shaped in a form of 13 mmφ×4 mm with a uniaxial pressing machine under a pressure of 20.4 MPa, and further subjected to CIP treatment under a pressure of 300 MPa to give a shaped body. The shaped body was placed on a magnesia flat plate, covered with an alumina crucible and sintered in air. In the sintering, the shaped body was maintained at 1,200° C. for 1 hour, and then at 1,500° C. for 1 hour. Tables 1 and 2 show the amounts of the raw materials and the results of measurement of the sintered body.

EXAMPLE 2

59.3 Grams of an aluminum powder (purity 99.987%, average particle diameter 28.6 μm, supplied by Toyo Aluminum Co., Ltd.), 131.2 g of an α-alumina powder (AL-440B, average particle diameter 2.6 μm, supplied by Sumitomo Chemical Co., Ltd.), 61.6 g of sodium carbonate (reagent special grade, supplied by Wako Pure Chemical Industries, Ltd.), 7.2 g of lithium carbonate (reagent special grade, supplied by Wako Pure Chemical Industries, Ltd.) and 56.0 g of a powder of a solid solution of 3 mol % by yttrium oxide in zirconia (SYZ-3, supplied by Sumitomo chemical Co., Ltd.) were added to cyclohexane, and these components were milled and mixed in the same manner as in Example 1 to obtain a powder mixture. Then, a shaped body was prepared from the powder mixture in the same manner as in Example 1, and sintered in the same manner as in Example 1. Tables 1 and 2 show the amounts of the raw materials and the results of measurement of the sintered body.

EXAMPLE 3

A shaped body was prepared from the same powder mixture as that of Example 2 in the same manner as in Example 1. The shaped body was placed on a magnesia plate, covered with an alumina crucible, and sintered in air. In the sintering, the shaped body was maintained at 1,200° C. for 1 hour, and then at 1,450° C. for 1 hour. Tables 1 and 2 show the amounts of the raw materials and the results of measurement of the sintered body.

EXAMPLE 4

A powder mixture was prepared in the same manner as in Example 2 except that the α-alumina was replaced with a γ-alumina powder (AKP-G015, supplied by Sumitomo Chemical Co., Ltd.). The powder mixture was shaped in a form of 45×5×4 mm with a uniaxial pressing machine under a pressure of 20.4 MPa, and further subjected to CIP treatment under a pressure of 300 MPa to give a shaped body. The shaped body was sintered in the same manner as in Example 1. Tables 1 and 2 show the amounts of the raw materials and the results of measurement of the sintered body.

EXAMPLE 5

160.0 Grams of the same aluminum powder as that used in Example 2, 59.0 g of the same sodium carbonate as that used in Example 1, 6.9 g of the same lithium carbonate as that used in Example 1 and 60 g of the same stabilized zirconia powder as that used in Example 1 were added to mineral spirit (Mineral Spirit A, supplied by Nippon Oil Co., Ltd.). These components were milled and mixed with an attrition mill for 6 hours in the same manner as in Example 1. The mineral spirit was removed from the resultant mixture by evaporation with a rotary evaporator. The resultant powder mixture was shaped in a form of 4×5×20 mm with a uniaxial pressing machine under a pressure of 20.4 MPa, and further subjected to CIP treatment under a pressure of 300 MPa to give a shaped body. The shaped body was placed on a magnesia plate, covered with an alumina crucible and sintered in air. In the sintering, the shaped body was maintained at 1,200° C. for 1 hour, and then at 1,500° C. for 1 hour. Tables 1 and 2 show the amounts of the raw materials and the results of measurement of the sintered body.

COMPARATIVE EXAMPLE 1

23.0 Grams of an aluminum powder (purity 99.987%, average particle diameter 28.6 μm, supplied by Toyo Aluminum Co., Ltd.), 191.2 g of an α-alumina powder (AL-440B, average particle diameter 2.6 μm, supplied by Sumitomo Chemical Co., Ltd.), 59.5 g of sodium carbonate (reagent special grade, supplied by Wako Pure Chemical Industries, Ltd.), 6.9 g of lithium carbonate (reagent special grade, supplied by Wako Pure Chemical Industries, Ltd.) and 56.0 g of a stabilized zirconia powder (SYZ-3, supplied by Sumitomo Chemical Co., Ltd.) which was a solid solution of 3 mol % of yttrium oxide in zirconia were formed into a shaped body in the same manner as in Example 1. The shaped body was sintered in the same manner as in Example 3. Tables 1 and 2 show the amounts of the raw materials and the results of measurement of the sintered body.

TABLE 1

| | Aluminum powder (g) (wt. %) | Alumina powder (g) | Sodium compound (g) | Structure stabilizer (g) | Zirconia powder (g) |
|---|---|---|---|---|---|
| Example 1 | 160.0 56.0 | 0 | 59.0 | 6.9 | 60.0 |
| Example 2 | 59.3 18.8 | 131.2 | 61.6 | 7.2 | 56.0 |
| Example 3 | 59.3 18.8 | 131.2 | 61.6 | 7.2 | 56.0 |
| Example 4 | 59.3 18.8 | 131.2 | 61.6 | 7.2 | 56.0 |
| Example 5 | 160.0 56.0 | 0 | 59.0 | 6.9 | 60.0 |
| Comparative Example 1 | 23.0 6.8 | 191.2 | 59.5 | 6.9 | 56.0 |

TABLE 2

| | Sintering temperature (°C.) | Relative density (%) | Formed phase (%) α | β | β″ | Ion conductivity (300° C.) (S · cm$^{-1}$) |
|---|---|---|---|---|---|---|
| Example 1 | 1500 | 96.9 | 0 | 14 | 86 | $7.8 \times 10^{-2}$ |
| Example 2 | 1500 | 96.0 | 0 | 18 | 82 | $8.5 \times 10^{-2}$ |
| Example 3 | 1450 | 91.1 | 0 | 22 | 78 | $3.8 \times 10^{-2}$ |
| Example 4 | 1500 | 96.4 | 0 | 19 | 81 | $4.0 \times 10^{-2}$ |
| Example 5 | 1500 | 97.8 | 0 | 11 | 89 | $14.7 \times 10^{-2}$ |
| Comparative Example 1 | 1450 | 72.9 | 12 | 18 | 70 | $<1 \times 10^{-3}$ |

What is claimed is:

1. A method of preparing a dense body formed of beta alumina which has a relative density of at least 85% for a solid electrolyte, which comprises steps of (1) shaping a mixture consisting essentially of, on the basis of a total amount of the mixture, 1% to 40% by weight of a sodium compound, 0.1% to 10% by weight of a structural stabilizer, an effective amount of a zirconia powder to promote oxidation of an aluminum powder, and the balance of an aluminum powder into a shaped body, and (2) reaction-sintering the shaped body at 1200° to 1600° C. so as to convert substantially the aluminum to beta alumina.

2. A method of preparing a dense body formed of beta alumina which has a relative density of at least 85% for a solid electrolyte, which comprises the steps of (1) shaping a mixture consisting essentially of, on the basis of a total amount of the mixture, 1% to 40% by weight of a sodium compound, 0.1% to 10% by weight of a structural stabilizer, an effective amount of a zirconia powder to promote oxidation of an aluminum powder, and the balance of aluminum powder and alumina powder in which the amount of the aluminum powder is at least 10% by weight, (2) reaction-sintering the shaped body at 1200° to 1600° C. so as to convert substantially the aluminum to beta alumina.

3. A method according to claim 1, wherein the structure stabilizer is selected from salts containing lithium.

4. A method according to claim 1, wherein the zirconia powder is of a tetragonal phase.

5. A method according to claim 2, wherein the structure stabilizer is selected from salts containing lithium.

6. A method according to claim 2, wherein the zirconia powder is of a tetragonal phase.

* * * * *